United States Patent
Fleck et al.

(10) Patent No.: US 6,977,811 B1
(45) Date of Patent: Dec. 20, 2005

(54) KEYBOARD WITH MOUSE FOR A HAND-HELD PORTABLE COMPUTER

(75) Inventors: Rod G. Fleck, Bellevue, WA (US); Jeffrey M. Johnson, Medina, WA (US); Michael D. Smith, San Jose, CA (US)

(73) Assignee: Vulcan Portals Inc., Seattle, WA (US)

( * ) Notice: Subject to any disclaimer, the term of this patent is extended or adjusted under 35 U.S.C. 154(b) by 227 days.

(21) Appl. No.: 10/338,791

(22) Filed: Jan. 7, 2003

(51) Int. Cl.[7] .............................................. G06F 1/16
(52) U.S. Cl. ...................... 361/686; 361/680; 361/683; 345/168; 400/88; 400/613; 455/550
(58) Field of Search ................................ 361/680–683, 361/686–687, 724–727; 400/88, 613, 472; 345/168, 173, 156, 157, 160, 167, 864, 171, 172, 178, 174–177, 19; 455/550, 66, 556, 425; D14/100, 115

(56) References Cited

U.S. PATENT DOCUMENTS

| | | | | |
|---|---|---|---|---|
| 5,473,347 A | * | 12/1995 | Collas et al. ................ | 345/169 |
| D416,256 S | | 11/1999 | Griffin et al. ............... | D14/191 |
| D433,460 S | | 11/2000 | Griffin et al. ............... | D21/329 |
| 6,278,442 B1 | | 8/2001 | Griffin et al. ............... | 345/169 |
| 6,313,731 B1 | * | 11/2001 | Vance ......................... | 338/185 |
| 6,323,845 B1 | * | 11/2001 | Robbins ...................... | 345/168 |
| 6,388,660 B1 | * | 5/2002 | Manser et al. .............. | 345/173 |
| 6,396,482 B1 | | 5/2002 | Griffin et al. ............... | 345/169 |
| D460,493 S | | 7/2002 | Griffin et al. ............... | D21/329 |
| 6,424,843 B1 | * | 7/2002 | Reitmaa et al. ............. | 455/566 |
| D461,803 S | | 8/2002 | Griffin et al. ............... | D14/346 |
| 6,437,682 B1 | * | 8/2002 | Vance ......................... | 338/185 |
| 6,452,588 B2 | | 9/2002 | Griffin et al. ............... | 345/169 |
| D464,995 S | | 10/2002 | Griffin et al. ............... | D21/329 |
| 6,489,950 B1 | | 12/2002 | Griffin et al. ............... | 345/168 |
| 6,628,511 B2 | * | 9/2003 | Engstrom .................... | 361/683 |
| 6,677,927 B1 | * | 1/2004 | Bruck et al. ................ | 345/156 |
| 6,726,106 B1 | * | 4/2004 | Han et al. ............... | 235/472.01 |
| 6,758,615 B2 | * | 7/2004 | Monney et al. ............. | 400/479 |
| 6,763,226 B1 | * | 7/2004 | McZeal, Jr. ................ | 455/90.2 |
| 2002/0165005 A1 | * | 11/2002 | Travers et al. .............. | 455/556 |
| 2002/0196234 A1 | * | 12/2002 | Gray .......................... | 345/163 |
| 2003/0081016 A1 | * | 5/2003 | Rahimzadeh et al. ....... | 345/864 |
| 2003/0117374 A1 | * | 6/2003 | McCloud .................... | 345/168 |
| 2003/0162540 A1 | * | 8/2003 | Nielsen ...................... | 455/425 |

* cited by examiner

*Primary Examiner*—Michael Datskovsky
(74) *Attorney, Agent, or Firm*—Seed IP Law Group PLLC

(57) ABSTRACT

A hand-held portable computer has a mouse button that is surrounded in close proximity by directional buttons. Placing the directional buttons in close proximity around the mouse button makes on-screen navigation easier, since the same single finger need only be moved by a small amount to actuate one or more of these buttons. If the mouse button is actuated, a mouse cursor can be moved about a page displayed on a display screen. If the directional buttons are actuated, the page can be panned around the display screen, while the mouse cursor remains stationary. The portable computer is also provided with a plurality of hot keys, and with buttons that are located off its keyboard, such as at the back of the portable computer.

14 Claims, 7 Drawing Sheets

KEYBOARD WITH MOUSE FOR A HAND-HELD PORTABLE COMPUTER

BACKGROUND OF THE INVENTION

1. Field of the Invention

The present disclosure relates generally to hand-held portable electronic devices, and in particular but not exclusively, relates to a mouse and keyboard for a hand-held portable computer having a small form factor.

2. Description of the Related Art

Modern desktop computers provide users with user-input mechanisms that are well suited for the applications that run on these computers. For example, desktop computers often use an external peripheral mouse that allows the user to conveniently navigate through menus, panes, and features of an application, as well as allowing navigation between applications and selection of various choices (usually via a "point and click" or a "click and drag") within a given application. Moreover, applications usually provide complex, yet convenient, graphical user interfaces (GUIs) that are designed to work in conjunction with the point and click features of a mouse or with particular keys on a keyboard of the desktop computer.

The nature of desktop computers makes them ideal for using user-input devices such as an external peripheral mouse and/or keyboard. There is usually sufficient desktop space or keyboard size to allow the user to easily navigate through an application or to select from various choices, without having to struggle with finger dexterity issues and awkward positioning. However, with laptop computers, a common complaint from users is that the keyboard is too small or that the mouse is difficult to control. The user has to "crowd" his fingers in order to properly use and select the appropriate keys on the cramped keyboard, and has to use a mouse that is more difficult to use because it is physically integrated within the keyboard, rather than being an attached external peripheral that can be conveniently used at arm's length away from the keyboard.

While laptops do have these disadvantages, they are, for the most part, adequate in terms of navigation and selection controls (via the mouse and keyboard). However, with ultra-portable devices, such devices typically have a substantially smaller form factor than a laptop or desktop computer. Their keyboards are significantly smaller than normal laptops and desktop computers, with "tiny" keys on the keypad. The keypads are of such a small size that the user can typically use only one or two fingers at a time to perform typing, or to perform clicking and dragging with a mouse integrated on the keyboard. This small keyboard size thus results in a very inconvenient user input mechanism.

Moreover, these devices also have a correspondingly and significantly smaller display screen size. The small display screen size, coupled with the small keyboard size, makes use of a mouse for navigation and selection extremely difficult. First, it is difficult for the user to see the "arrow" or cursor (representing the mouse) on the small display screen. Second, it is difficult to provide mouse functionality on the keyboard itself, due to the small size of the keyboard. Even if a mouse were integrated into the keyboard of a small hand-held device in a manner similar to conventional laptop computers, the mouse would be difficult to maneuver or otherwise control with a single fingertip. Imagine the awkwardness, for instance, of trying to hold the portable device with the left hand, while trying to maneuver the mouse with a fingertip from the right hand.

BRIEF SUMMARY OF THE INVENTION

One aspect of the invention provides a hand-held electronic apparatus having a small form factor. The apparatus includes a housing and a keyboard integrated with the housing. A mouse assembly is integrated with the housing, with the mouse assembly including a mouse button and a plurality of directional buttons that at least partially surround the mouse button. The directional buttons are arranged in close proximity to the mouse button to permit a same single fingertip to actuate at least one of the mouse button and one of the directional buttons.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
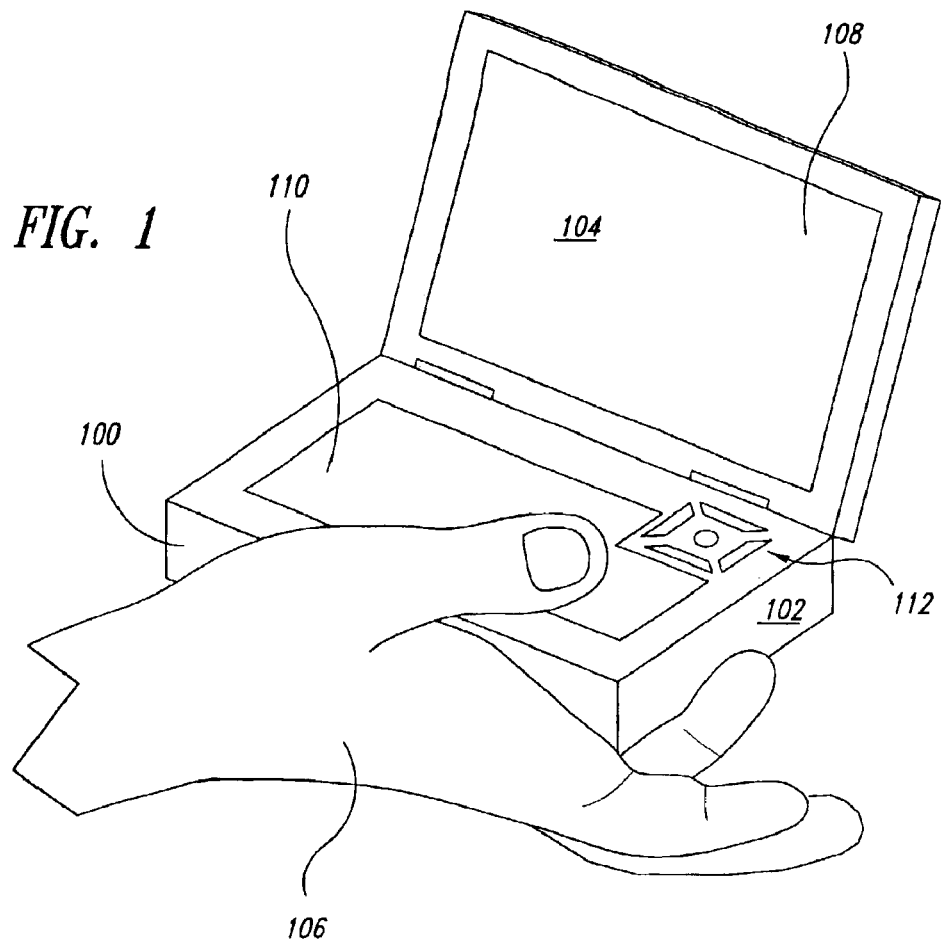
FIG. 1 shows a portable hand-held computer in accordance with an embodiment of the invention.

Embodiments of a mouse assembly, keypad, and buttons for a hand-held device (such as a portable computer having a small form factor) are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a hand-held portable electronic device, such as a portable computer having a small form factor. The portable computer has a keypad that is arranged in a manner that is comfortable and convenient to use by a user, considering the significantly smaller overall size of the portable computer and of its keyboard and display screen. In particular, the keypad includes (or is adjacent to) a mouse assembly (or other similar cluster) having a mouse button and directional buttons.

The mouse button can be clicked to perform typical mouse-click operations. The directional buttons are placed in close proximity to the mouse button, in an arrangement where the directional buttons at least partially surround the mouse button. The directional buttons correspond to right/left and up/down arrow keys (as well as page up/down buttons) typically found on a conventional keyboard. However, by arranging these directional buttons in close proximity around the mouse button, the user can more easily use a single fingertip (such as a thumb) to perform navigation through a user interface on the display screen of the portable-computer. The user need only move his thumb slightly in one direction or another, pressing the appropriate directional buttons in the process, to easily navigate through the user interface. Moreover, concentrating the mouse and directional buttons in a clustered area contributes to the overall small form factor of the portable device, where real estate is a premium.

Accordingly, the cursor corresponding to the mouse button can be kept stationary on the display screen, while the directional buttons are used to "pan" across the page or screen, such as up or down or left or right. Once a particular portion of the page has been positioned in this manner under the cursor, the user can click the mouse button to select a desired item that is located at that portion of the page.

In an embodiment, the keyboard of the portable computer further includes left and right mouse buttons, which are located in another region of the keyboard different from the mouse assembly. The portable computer can further include a plurality of "hot keys" that allow the user to quickly launch applications and to switch from one application to another, without the need to explicitly navigate to and select these application via the display screen. In yet another embodiment, buttons can be conveniently located off the keyboard, such as at the rear side of the portable computer, where the user's fingertips can easily locate and press these buttons. These buttons may be used for tabbing and "enter," such as when filling out fields in an on-screen form, for instance.

FIG. 1 shows a portable hand-held computer 100 in accordance with an embodiment of the invention. While the portable computer 100 is used as the illustrative example throughout this application, it is appreciated that other embodiments of the invention may be implemented with devices that may not necessarily be thought of as a "computer" by the average individual. Examples include wireless communication devices, display devices, monitors, audio-video equipment, consumer electronic devices, or other electronic device that can have a reduced form factor and that can benefit from the mouse assembly, keyboard, or additional buttons described herein.

As shown, the portable computer 100 is similar in appearance to a laptop, in that it comprises first and second portions 102 and 104, respectively. The first portion 102 can include a keyboard 110 and housing for the internal electronic components (such as a processor, disk drives, graphics drivers, and so forth). The first portion 102 further includes a mouse assembly 112 or other cluster of buttons. The keyboard 110 and the mouse assembly 112 will be described in further detail later below. The second portion 104 folds over the first portion 102 (when in a closed position), and includes a display screen 108 for displaying information while the second portion 104 is unfolded to an upright position (as shown in FIG. 1).

Unlike a conventional laptop, however, the portable computer 100 is substantially smaller in size in terms of both volume and weight. An example dimensional size of the portable computer 100 is 140 mm long, 100 mm wide, and 30 mm thick (while closed), with a weight of approximately one pound. The display screen 108 on the second portion 104 is of a resolution comparable to a desktop computer monitor. In general, the size of the display screen 108, the size of the internal components (e.g., chips and circuit boards) located within the first portion 102, and the strategic placement of the internal components (e.g., density), and other factors will influence the overall form factor of the portable computer 100. As illustrated in FIG. 1, the portable computer 100 has a size such that it can be held securely in a hand 106 of a user.

Figure 2:
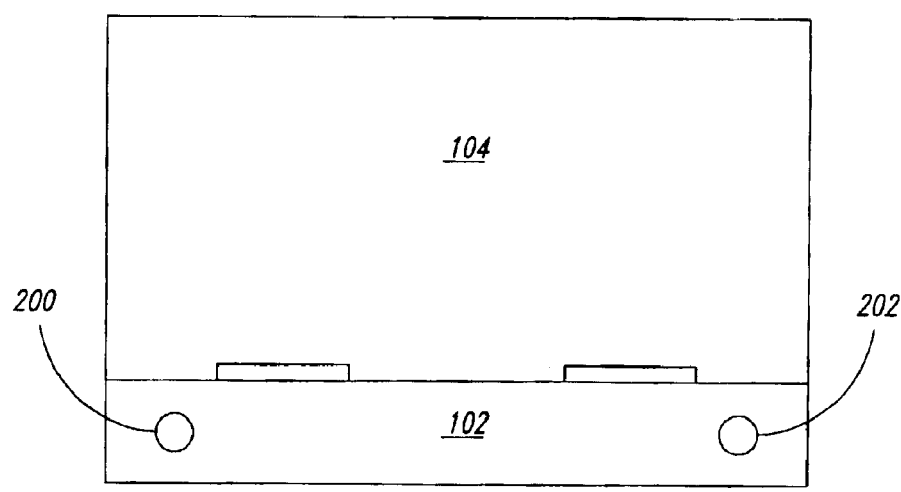
FIG. 2 is a rear-side view of the portable computer of FIG. 1, showing additional buttons in accordance with an embodiment of the invention.

FIG. 2 is a rear-side view of the portable computer 100 of FIG. 1, showing additional buttons 200 and 202 in accordance with an embodiment of the invention. These buttons are located on the rear-side surface of the first portion 102, such that the user's fingertips, when extended, can easily reach, locate, and press these buttons 200 and 202. It is appreciated, however, that these or other off-keyboard buttons may be located else where on the housing of the portable computer 100.

The buttons 200 and 202 can comprise buttons that can be physically pressed, or they can comprise touch-pad types of buttons that can sense finger pressure to determine whether a press is being performed. One example use of the buttons 200 and 202 will be explained later below with reference to FIG. 7.

Figure 3:
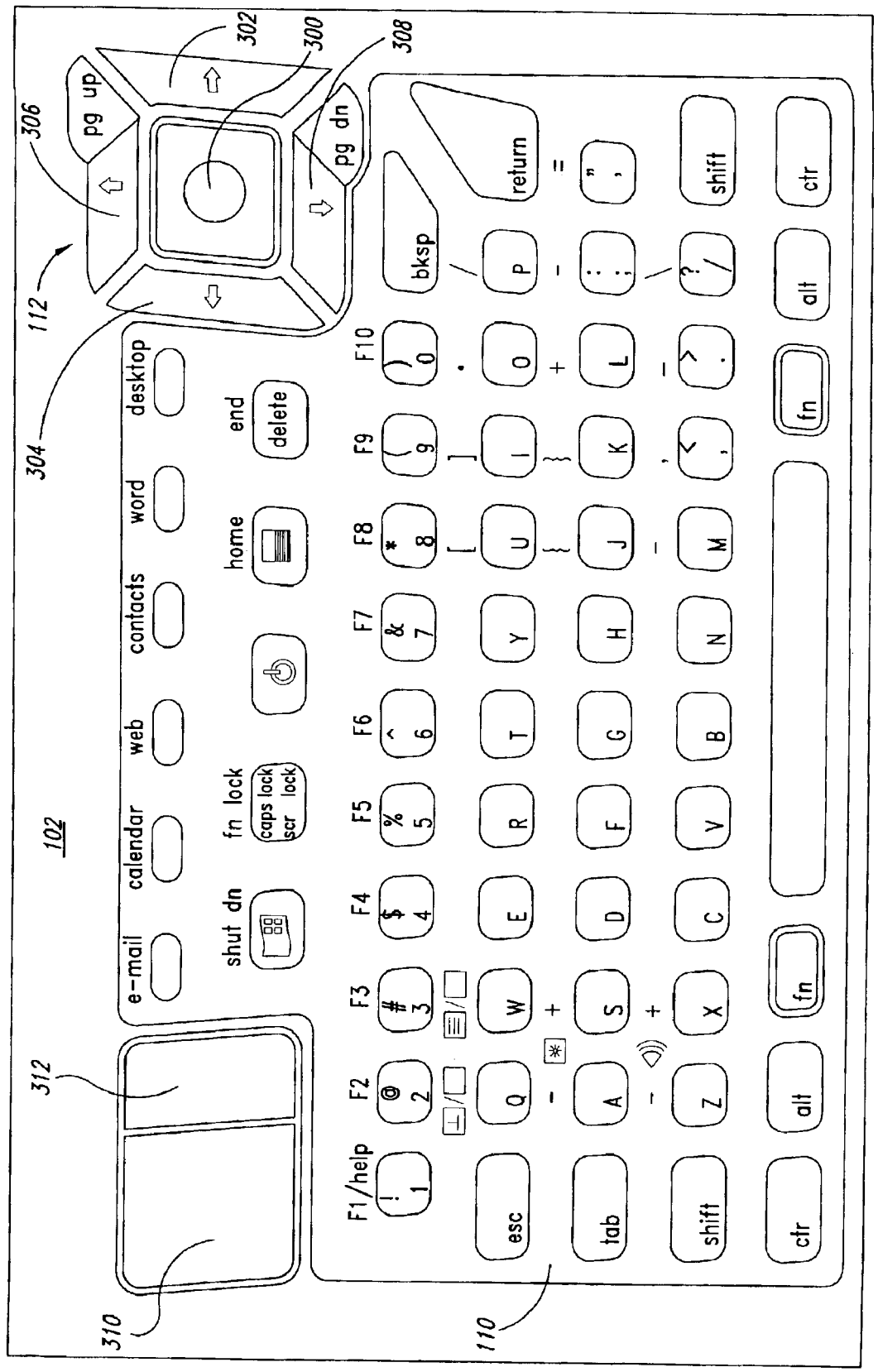
FIG. 3 shows an embodiment of a keyboard and a mouse assembly for the portable computer of FIGS. 1–2.

FIG. 3 shows an embodiment of the keyboard 110 and the mouse assembly 112 for the portable computer 100 of FIGS. 1–2. The mouse assembly 112 includes a mouse button 300, which can be used to control the positioning of a cursor on the display screen 108 and for selecting and clicking on items in a user interface presented thereon. The mouse button 300, in one embodiment, can be similar to mouse buttons found on typical laptop computers. That is, the mouse button 300 is mounted in the first portion 102 in a manner that it can be physically rotated or otherwise moved (to cause corresponding movement of the screen cursor) by applying directional fingertip pressure. The mouse button 300 of this embodiment is also self-centering in that it moves back to a centered position when the fingertip pressure is removed—this allows the mouse button 300 to recenter automatically without requiring the user to reposition the mouse button 300 to its original orientation. In an embodiment, the mouse button 300 can be pressed vertically (or "tapped") by a fingertip to perform a mouse click.

Because of the small form factor of the portable computer 100, the mouse button 300 is located in the upper right corner of the first portion 102. This allows the user's right hand to comfortably grip the first portion 102, while positioning the right thumb over the mouse button 300. Thus, the right thumb of the user's hand 106 can be used to actuate the mouse button 300. The mouse button 300 can comprise part of the keyboard 110 itself, or it can be separated from but adjacent to the keyboard 110.

In an embodiment, a plurality of directional buttons 302–308 at least partially surrounds the mouse button 300 and are positioned adjacent to the mouse button 300 in close proximity. Right and left arrow buttons 302 and 304, respectively, are located to the right and left, respectively, of the mouse button 300. The right arrow button 302 is used to incrementally pan the display screen 108 to the right, and the left arrow button 304 is used to incrementally pan the display screen 108 to the left. In an embodiment, this right/left panning can occur while the mouse cursor is kept stationary on the display screen 108, as will be illustrated and described later below.

The right arrow button 302 and the left arrow button 304 may have generally elongated vertical shapes, and can be positioned several millimeters away from the mouse button 300, with the mouse button 300 centered between them. This allows the user to rest his thumb over the mouse button 300, and then actuate the right arrow button 302 or the left arrow button 304 by simply "rocking" his thumb sideways. Therefore, a convenient mechanism for horizontal navigation and selection is provided by the mouse button 300, the right arrow button 302, and the left arrow button 304, since the user does not have to reposition his fingertips across the keyboard 110 in order to find and actuate horizontal navigation keys.

In a similar manner, up and down arrow buttons 306 and 308, respectively, are located to the top and bottom, respectively, of the mouse button 300. The up arrow button 306 is used to incrementally pan the display screen 108 upward, and the down arrow button 308 is used to incrementally pan the display screen 108 downward. In an embodiment, this up/down panning can occur while the mouse cursor is kept stationary on the display screen 108, as will be illustrated and described later below.

The up arrow button 306 and the down arrow button 308 may have generally elongated horizontal shapes, and can be positioned several millimeters away from the mouse button 300, with the mouse button 300 centered between them. Again, this arrangement allows the user to rest his thumb over the mouse button 300, and then actuate the up arrow button 306 or the down arrow button 308 by simply "rocking" his thumb forward and backward, respectively. Therefore, a convenient mechanism is also provided for vertical navigation and selection by the mouse button 300, the up arrow button 306, and the down arrow button 308, since the user does not have to reposition his fingertips across the keyboard 110 in order to find and actuate vertical navigation keys.

It is noted that the up arrow button 306 and the down arrow button 308 may also be used to perform page up and page down operations, respectively. That is, these buttons may each be broken into two segments in an embodiment, where one segment is used to perform the incremental line-by-line navigation, while the second segment is used to perform the paginated navigation. In another embodiment, whether line-by-line navigation or paginated navigation is performed depends on which side of the elongated button the user is applying his thumb pressure. In yet another embodiment, a single one of the buttons (e.g., the button is not segmented) may be used to perform both operations, such as by also pressing a shift key in addition to the directional button when paginated movement is desired.

In an embodiment, the mouse assembly 112 may be provided with acceleration and interpolation capabilities. That is, the degree of fingertip pressure and direction can be sensed in order to accelerate the direction of cursor movement in a particular direction. For example, users may tend to press the mouse button 300 and/or directional buttons 302–308 harder when they wish to speed up cursor movement. An embodiment of the invention detects this directional fingertip pressure to interpolate both the degree of acceleration and the general direction where movement is desired.

In an embodiment, the keyboard 110 can include or have positioned adjacent to it, left and right mouse buttons 310 and 312, respectively. These buttons 310 and 312 perform similar functions as their counterparts on a hand-held mouse for a desktop computer. A difference is that the buttons 310 and 312 are positioned in a location on the keyboard 110 where they can be actuated with the left thumb (e.g., they are located at the upper left corner of the first portion 102), while the right thumb performs navigation of the mouse cursor using the mouse assembly 112.

In an embodiment, the keyboard 112 includes a plurality of "hot keys." The hot keys illustrated in FIG. 3 include, but are not limited to, email, calendar, web, contacts, word, and desktop hot keys. These hot keys may be thought of as "accelerator" keys. That is, they accelerate the launching or activating of an application, without requiring the user to perform on-screen navigation. Reducing the requirements for on-screen navigation is an advantage with the portable computer 100, since its small form factor weighs against convenient navigation.

As an illustration, the user can press the email hot key to launch an email application. If the user then subsequently presses the web hot key, the email application becomes inactive, and a web browser application launches and becomes active. If the user then presses the email hot key again, the email application does not re-launch. Rather, the previously launched email application goes from inactive to active state, while the web browser application goes inactive. Thus, the hot keys of an embodiment provide a convenient mechanism to "flip" between applications, without the user having to navigate to on-screen status bars using a mouse cursor. Again, the reduction of the requirements to perform on-screen navigation is an advantage for the portable computer 100 that has a small form factor, since the display screen 108 has a small size (e.g., its displayed items are difficult to view).

Figure 4:
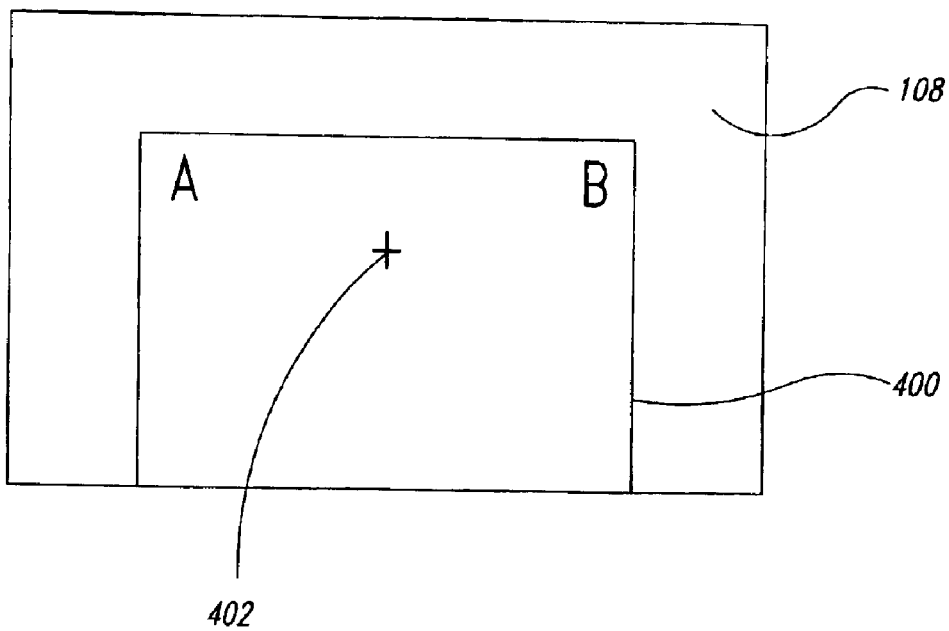
FIGS. 4–6 are example screen shots illustrating operation of the mouse assembly of FIG. 3 in accordance with embodiments of the invention.
Figure 5:
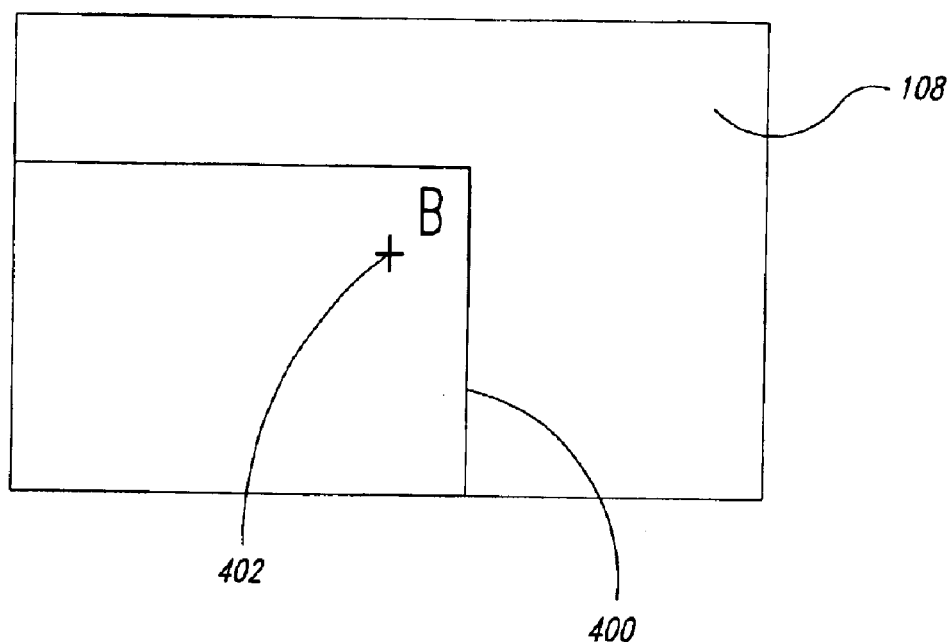
Figure 6:
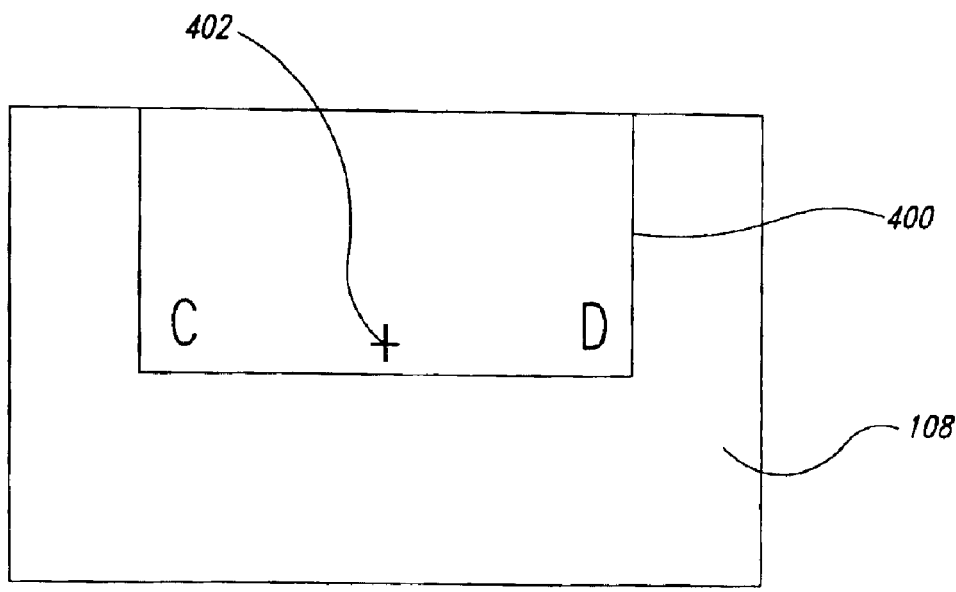

FIGS. 4–6 are example screen shots illustrating operation of the mouse assembly 112 of FIG. 3 in accordance with embodiments of the invention. In FIG. 4, a portion of a page 400 is rendered on the display screen 108. The page 400 may be a portion of a web page or a Microsoft Word™ document, for instance. The letters A and B symbolically represent the upper left and upper right regions of the page 400, respectively. A mouse cursor 402 is positioned in a generally center region of the display screen 108.

In one embodiment, the user can actuate the mouse button 300 to move the mouse cursor 402 about the page 400, while the page 400 remains stationary within the display screen 108 (unless of course the mouse cursor 402 reaches the edge of the displayed page 400, in which case the display screen 108 will scroll to the adjacent region of the page 400). However, an embodiment of the invention allows the user to keep the mouse cursor stationary, while the page 400 itself is repositioned or panned.

An example of this situation is illustrated in FIG. 5. In FIG. 5, the mouse cursor 402 has remained stationary, since the user has not actuated the mouse button 300. Instead, the user has clicked on the right arrow button 302 to pan to the right, and therefore the upper left region A of the page 400 has moved off-screen. The user may similarly click on the left arrow button 304 to pan to the left to show the upper left region A and to move the upper right region B off-screen.

FIG. 6, in comparison to the screen shot of FIG. 4, is a screen shot-after the user has used the down arrow button 308 to pan towards the bottom of the page 400. The upper left region A and the upper right region B have moved off-screen, while a lower left region C and a lower right region D of the page 400 have appeared on-screen. The mouse button 300 was not actuated, and therefore, the mouse cursor 402 has remained stationary.

It is noted that any combination of the directional buttons 302–308 may be used along with or to the exclusion of the mouse button 300, to achieve navigation in any desired direction. For the sake of simplicity and brevity, such directional positioning will not be further described or illustrated herein, since performance of such positioning would be familiar to one skilled in the art after having reviewed the previous discussion and accompanying drawings.

Figure 7:
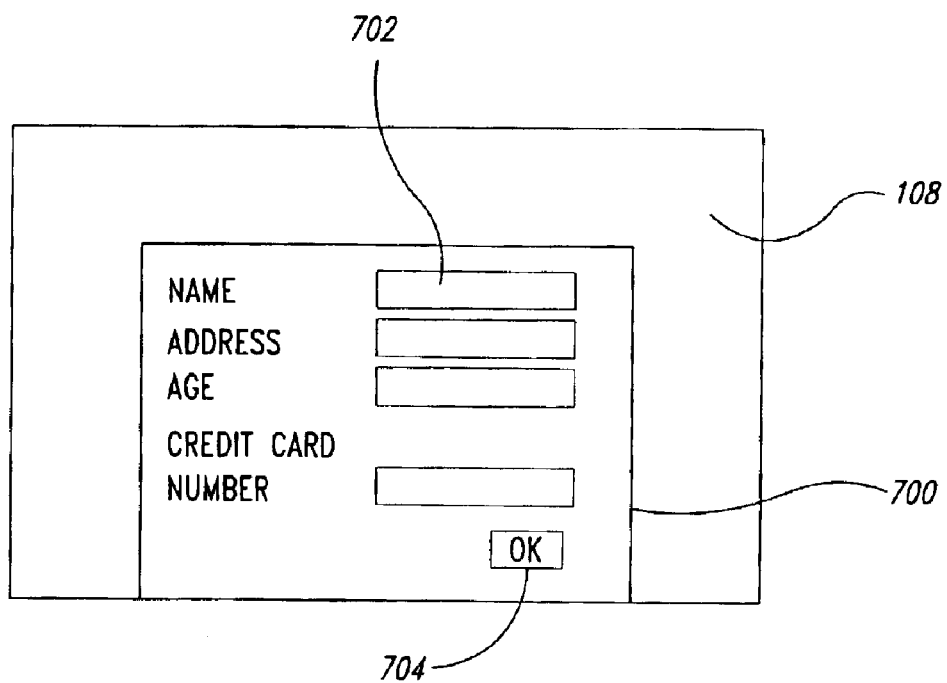
FIG. 7 is an example screen shot of a form that can be navigated through using the buttons depicted in FIG. 2 in accordance with an embodiment of the invention.

FIG. 7 is an example screen shot of a form 700 that can be navigated through using the buttons 200 and 202 depicted in FIG. 2 in accordance with an embodiment of the invention. For purposes of illustration, the button 202 will be described in terms of providing a tab operation, while the button 200 provides an enter operation. In some embodiments, these or other off-keyboard buttons can perform other types of operations. In an embodiment, the buttons 200 and 202 (or other off-keyboard buttons) are user-programmable.

The form 700 can comprise, for instance, an on-line form that is provided by way of a web page. The form 700 has a plurality of fields 702 where the user has to enter information, such as when performing an on-line purchase or requesting information. Ordinarily, the user of a desktop computer would have no difficulty using a peripheral mouse or keyboard tab keys to move from one field to another. However, with a hand-held device having a small form factor, such as the portable computer 100, use of a mouse or the keyboard tab key can be difficult. The keyboard tab key is small in size, and the mouse button 300 has to be skillfully used to maneuver the mouse cursor 400 from one field to another, where the form 400 is rendered in the small display screen 108.

Accordingly, the button 202 can be used as a tab key to tab from one field 702 to another, without having to use the mouse button 300 or the keyboard tab key. Use of the button 202 allows the user to accelerate navigation through the form 700.

Once the form 700 has been completed, the user can maneuver the mouse cursor 400 over an OK button 704 and click it. Alternatively, the user may locate and press the Enter key on the keyboard 110. Still alternatively, the user can press the button 200 on the rear side of the portable computer. The button 200 operates as an Enter key, and is more conveniently located and actuated as compared to the mouse cursor 400 and the Enter key on the keyboard 110.

Figure 8:
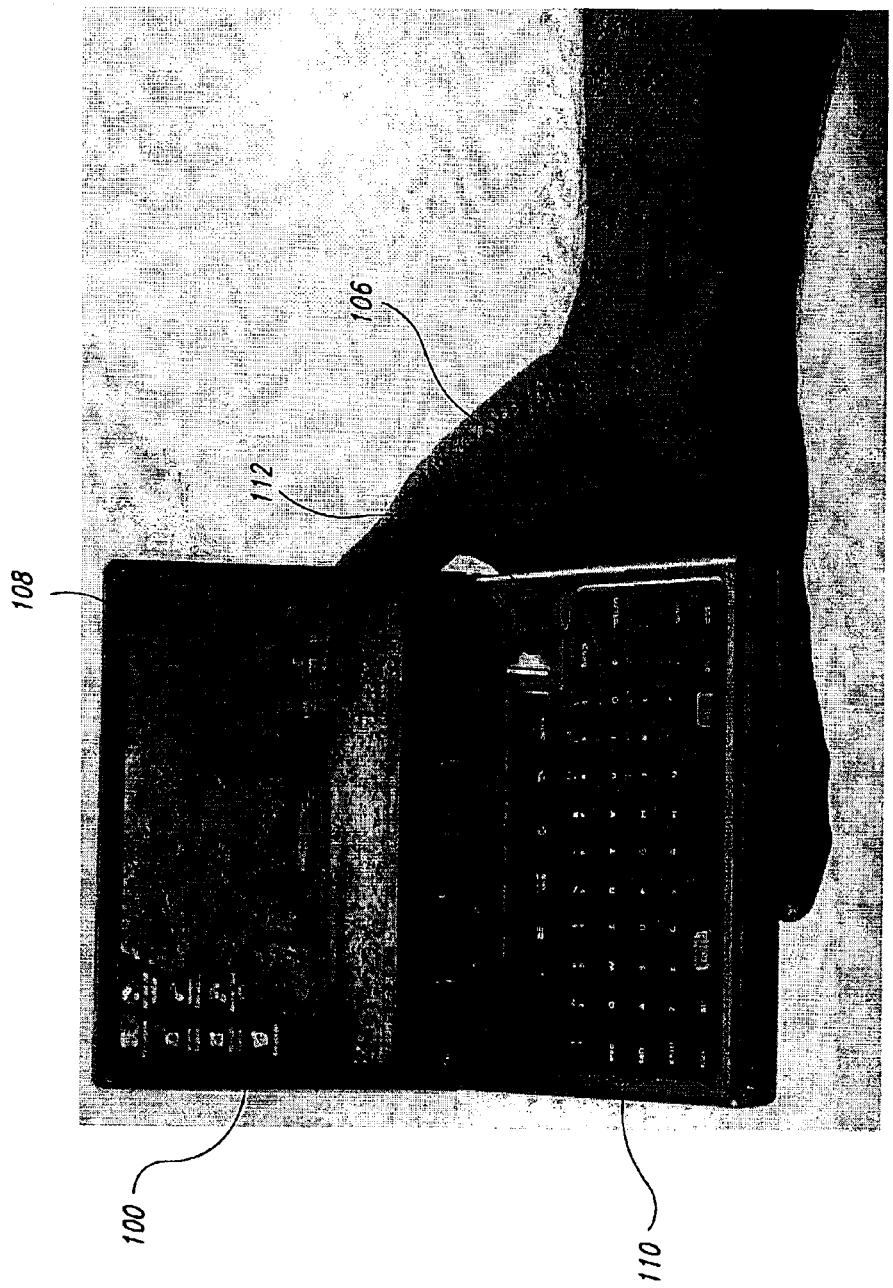
FIG. 8 is another illustration of the portable hand-held computer in accordance with an embodiment of the invention.

FIG. 8 is another illustration of the portable hand-held computer 100 in accordance with an embodiment of the invention. In particular, FIG. 8 illustrates an actual size of an embodiment, in a manner that the compact size allows the portable computer to be held in the hand 106 of the user. The keyboard 110 and the easily accessible mouse assembly 112 are also shown in the figure.

Figure 9:
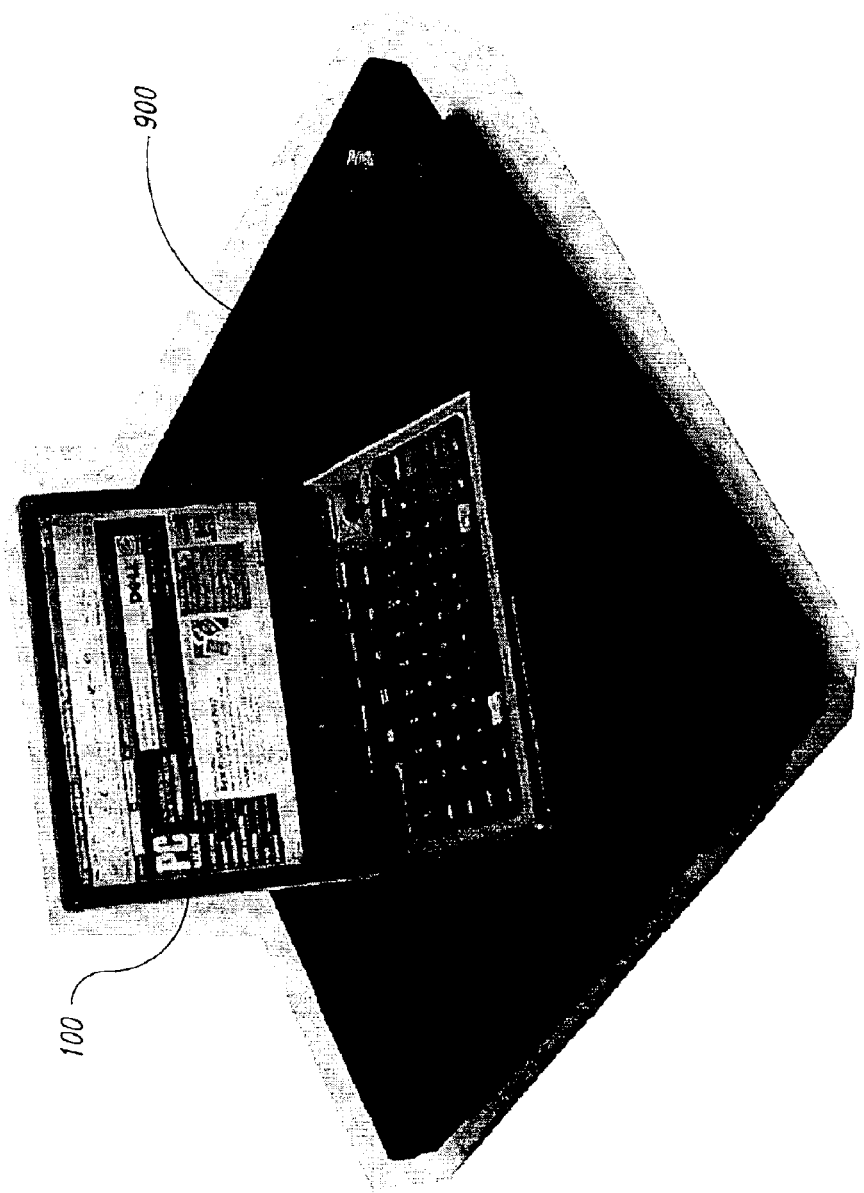
FIG. 9 is an illustration of the embodiment of the portable hand-held computer of FIG. 8 in comparison with a laptop computer.

FIG. 9 is an illustration of the embodiment of the portable computer 100 of FIG. 8 in comparison with a laptop computer 900. As depicted, the embodiment has a size that is significantly smaller than that of the laptop computer 900, while still providing capabilities (software, hardware, keyboard, display screen, navigation, and so forth) that are useful to a user.

Figure 10:
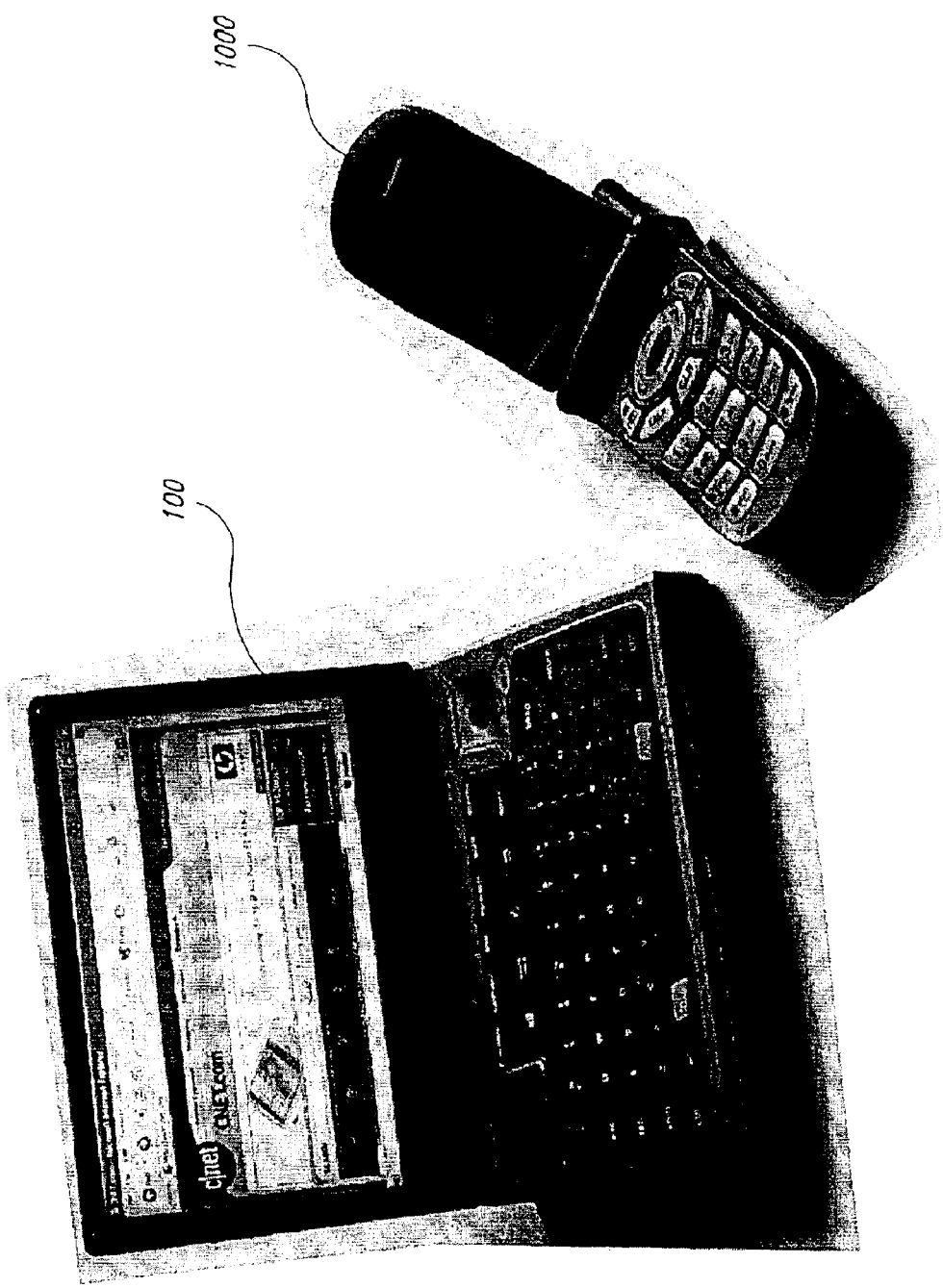
FIG. 10 is an illustration of the embodiment of the portable hand-held computer of FIG. 8 in comparison with a cellular telephone.

FIG. 10 is an illustration of the embodiment of the portable computer 100 of FIG. 8 in comparison with a cellular telephone 1000. Again, the compact size of the embodiment of the portable computer 100 is apparent, being larger (but not much larger) than the cellular telephone 1000.

Various other features of embodiments of the portable computer 100 are disclosed in U.S. application Ser. No. 10/338,802, entitled "SYSTEM AND METHOD FOR HEAT REMOVAL FROM A HAND-HELD PORTABLE COMPUTER WHILE DOCKED"; U.S. application Ser. No. 10/338,815, entitled "NAVIGATION AND SELECTION CONTROL FOR A HAND-HELD PORTABLE COMPUTER"; and U.S. application Ser. No. 10/338,761, entitled "HEAT DISSIPATION FROM A HAND-HELD PORTABLE COMPUTER," all filed concurrently herein, assigned to the same assignee as the present application, and incorporated herein by reference in their entireties.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For instance, the mouse assembly 112 has been illustrated and described herein as a cluster of physical buttons that are in close proximity to each other. It is appreciated that the mouse button 300, for example, can be embodied as a clickable trackball or other different mechanism, as opposed to the mechanism described above. In an embodiment, for instance, the mouse assembly 112 can be embodied as one or more touch pads or as soft keys. Moreover, the mouse assembly 112 can be positioned in other regions of the portable computer 100 (such as adjacent to a left region of the keyboard 110, for left-handed users), alternatively to being adjacent to the upper right region of the keyboard 110 as illustrated.

These and other modifications can be made to the invention in light of the above detailed description. The terms used in the following claims should not-be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A hand-held electronic apparatus having a small form factor, the apparatus comprising:
   a mouse assembly including a mouse button and a plurality of directional buttons that surround the mouse button by more than 180 degrees, the directional buttons being arranged in close proximity to the mouse button to permit a same single fingertip to actuate the mouse button or one of the directional buttons; and
   left and right mouse buttons.

2. The apparatus of claim 1 wherein the directional buttons include:
a right arrow key positioned right of the mouse button;
a left arrow key positioned left of the mouse button;
an up arrow key positioned above the mouse button; and
a down arrow key positioned beneath the mouse button.

3. The apparatus of claim 1 wherein the directional buttons have a generally elongated shape.

4. The apparatus of claim 1 wherein actuation of the mouse button includes a movement of the mouse button to perform navigation or a click of the mouse button to perform a selection.

5. The apparatus of claim 1 wherein the buttons of the mouse assembly comprise buttons that can be physically moved.

6. The apparatus of claim 1 wherein the buttons of the mouse assembly comprise touch pad buttons.

7. The apparatus of claim 1, further comprising a keyboard, wherein the mouse assembly is located adjacent to an upper right region of the keyboard.

8. The apparatus of claim 1, further comprising a keyboard having a plurality of hot keys that are associated with a corresponding plurality of applications, wherein actuation of any one of the hot keys accelerates activation of its corresponding application without having to perform on-screen navigation for that application.

9. The apparatus of claim 1, further comprising:
a housing;
a keyboard coupled to the housing; and
a plurality of user-programmable buttons located on the housing and off the keyboard.

10. The apparatus of claim 1, further comprising:
a housing;
a keyboard coupled to the housing; and
off-keyboard tab and enter keys, these off-keyboard keys being located at a rear side of the housing.

11. The apparatus of claim 1 wherein actuation of the directional buttons can produce panning within a display screen, with a generally stationary mouse cursor on the display screen.

12. The apparatus of claim 1 wherein the directional buttons include paginated navigation keys.

13. The apparatus of claim 1 wherein the keyboard includes at least one button that can be configured to be used as a soft key.

14. A hand-held electronic apparatus having a small form factor, the apparatus comprising:
a housing;
a mouse assembly positioned on the housing, the mouse assembly including a mouse button and a plurality of directional buttons that at least partially surround the mouse button, the directional buttons being arranged immediately adjacent to and spaced apart from the mouse button to permit a same single fingertip to actuate the mouse button or one of the directional buttons; and
left and right mouse buttons positioned on the housing.

* * * * *